United States Patent [19]

Kimura et al.

[11] Patent Number: 5,383,037
[45] Date of Patent: Jan. 17, 1995

[54] APPARATUS FOR IMAGE CODING AND DECODING BASED ON COLOR COMPONENTS IN AN IMAGE SIGNAL

[75] Inventors: Shunichi Kimura; Koh Kamizawa, both of Kanagawa, Japan

[73] Assignee: Fuji Xerox Co., Ltd., Tokyo, Japan

[21] Appl. No.: 970,393

[22] Filed: Nov. 2, 1992

[30] Foreign Application Priority Data

Nov. 6, 1991 [JP] Japan ................. 3-290242

[51] Int. Cl.⁶ .................. H04N 1/415; H04N 1/46
[52] U.S. Cl. .................... 358/539; 358/520; 358/433
[58] Field of Search ............ 358/539, 426, 261.3, 358/432, 433, 133, 520, 518; 382/56; 348/384, 390, 391, 396, 403, 420

[56] References Cited

U.S. PATENT DOCUMENTS 3,604,840  9/1971  Sharp ...................... 358/539

OTHER PUBLICATIONS

Trend On International Standardization for Color Still Picture, T. Omachi, NEC Corporation, pp. 43–48 (1990). No translation to English.

*Primary Examiner*—Scott A. Rogers
*Attorney, Agent, or Firm*—Finnegan, Henderson Farabow, Garrett & Dunner

[57] ABSTRACT

An image coding apparatus includes a color component. converter 2 for converting an input image signal 1 into predetermined color spaces which have been subdivided into independent color components, a segmenting circuit 4 for subdividing the converted image signals into predetermined image regions for the respective color components, a color information selecting circuit 9 for judging a condition of the color component of the input image based upon the components of the input image for each image region, and also a coding device 5 for performing a coding process with respect to the respective color components. In the color information selecting circuit 9, a judgement is made whether or not there is color information by comparing the pixel component of the pixel within the input image block with a predetermined threshold value. When it is judged that the input image block corresponds to the monochromatic information, the color difference component is not transferred or not stored. Only when it is judged that the input image block corresponds to the color information, the color difference component is transferred, or stored.

4 Claims, 5 Drawing Sheets

APPARATUS FOR IMAGE CODING AND DECODING BASED ON COLOR COMPONENTS IN AN IMAGE SIGNAL

BACKGROUND OF THE INVENTION

1. Field of the Invention

The present invention relates to an image coding apparatus for coding a color image signal used in a color facsimile device or the like, and also to an image decoding apparatus for decoding a coded image signal.

2. Description of the Prior Art

For instance, in a color facsimile system, red, green and blue color image signals are produced by reading a color original by utilizing a color image scanner, and then these color image signals are transmitted through a communication line, or channel such as a telephone line. Generally speaking, when these color image signals are transmitted, signal coding operation is carried out so as to reduce the amount of transmission data. Similarly, this signal coding operation is performed when an image signal is stored into a signal storage apparatus. In particular, since the amount of color image data is greater than that of monochrome image data, an effective image coding method is necessarily required.

Then, various sorts of image coding methods have been proposed. For example, as the color still picture coding method, in the JPEG (Joint Photographic Expert Group) jointed ISO with CCITT, there is a color still picture coding system, taking account of the international standardization. This coding system is described in the lecture on PCSJ image coding system held in 1990, "Trend on International Standardization for Color Still Picture" by Ohmachi, pages 43 to 48. In this coding system, the input image is processed by the discrete cosine transform (DCT). The transformed input image is further quantized and then entropy-coded to output compressed data. The compressed data is entropy-decoded. The entropy-decoded data is further inverse-quantized and then inverse-discrete cosine transformed, so that a decoded image is outputted.

Figure 9:
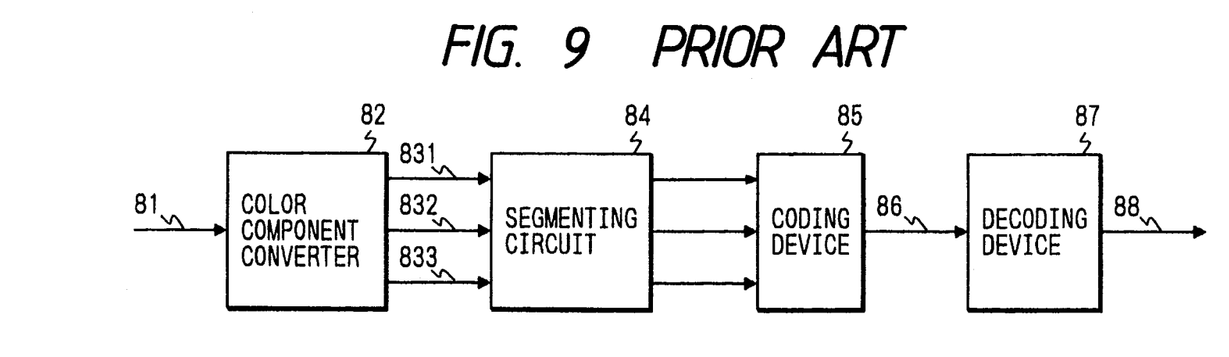
FIG. 9 is a schematic block diagram for indicating the arrangement of the conventional image coding apparatus.

In FIG. 9, there is shown an arrangement of an image coding apparatus in this image coding method with employment of a color component such a density color difference system and a luminance color difference system.

In the arrangement shown in FIG. 9, reference numeral 81 shows an input image signal, reference numeral 82 denotes a color component converter for converting a color component of the input image signal 81, and reference numerals 831, 832, 833 represent color components converted by the color component converter 82. Furthermore, reference numeral 84 indicates a segmenting (blocking) circuit for dividing the respective color components 831, 832, 833 into blocks made of m×n pixels, reference numeral 85 shows a coding device (encoder) for coding the images segmented by the segmenting circuit 84 with respect to each color component, and reference numeral 86 denotes either an image storage apparatus, or a transmission path, reference numeral 87 indicates a decoder for decoding the segmented images with respect to the respective color image components, and also reference numeral 88 shows a decoded image signal.

Figure 5:
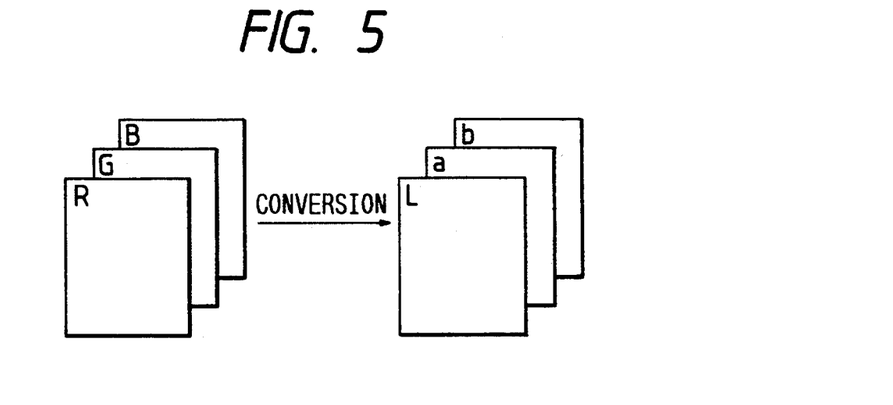
FIG. 5 is an explanatory diagram for explaining one example of a color component conversion performed during the image coding operation.
Figure 6:
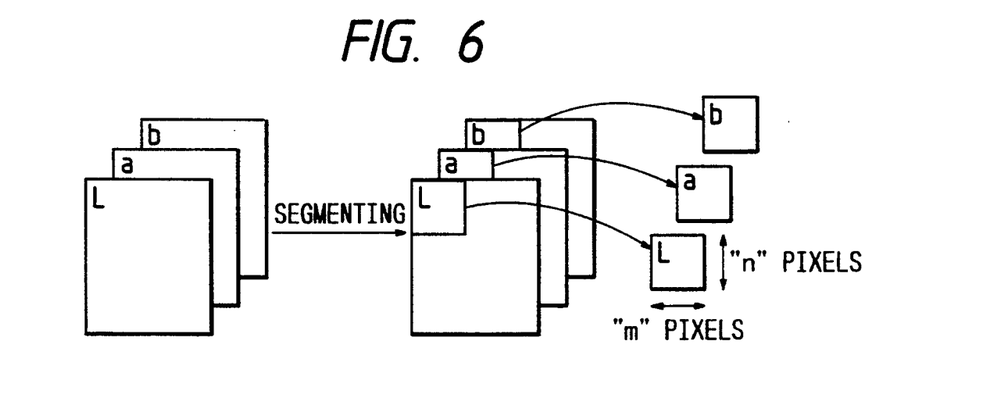
FIG. 6 is an explanatory diagram for explaining one example of a segmenting operation executed during the image coding operation.

A description will now be made of an operation of the image coding apparatus. The input image signal 81 is input into the color component converter 82 to be converted into a color component of either the density color difference system, or the luminance color difference system. For example, as schematically illustrated in FIG. 5, when the input image signal 81, which has been input with the RGB color difference system, is converted by the color component converter 82 into the Lab color difference system corresponding to the density color difference signal system, the color component converter 82 executes a process as shown in the following formula:

$$\begin{bmatrix} L \\ a \\ b \end{bmatrix} = \begin{bmatrix} a_{00} & a_{01} & a_{02} \\ a_{10} & a_{11} & a_{12} \\ a_{20} & a_{21} & a_{22} \end{bmatrix} \begin{bmatrix} R \\ G \\ B \end{bmatrix}, \quad (1)$$

where $a_{ij}$ (i, j=0, 1, 2) is a conversion coefficient, R, G, B are color components of the RGB color difference system, and L, a, b are color components of the Lab color difference system. As represented in FIG. 6, all of these color difference components 831, 832 and 833 are divided by the segmenting circuit 84 into blocks constructed of m×n pixels, and furthermore coded by the coding device 85, so that the resultant coded color segments are transferred to either the transmission path, or the image storage apparatus 86. For instance, to increase the coding efficiency in the coding device 85, the discrete cosine transformation (DCT) as defined in the following formula is performed with respect to the respective blocks subdivided by the above-described segmenting circuit 84 in case of m=n=N:

$$F(u,v) = \quad (2)$$

$$\frac{2}{N} C(u)C(v) \sum_{i=0}^{N-1} \sum_{j=0}^{N-1} f(i,j)\cos\frac{(2i+1)u\pi}{2N} \cos\frac{(2j+1)v\pi}{2N},$$

where C(w) (=C(u), C(v)) is defined as follows:

$$C(w) = \begin{cases} \frac{1}{\sqrt{2}} & w = 0 \\ 1 & w \neq 0 \end{cases} \quad (3)$$

In the above-described formula, symbol f(i,j) indicates an image signal within the blocks subdivided by the segmenting circuit 84, and F(u,v) represents a discrete cosine transform coefficient for transforming the above-explained image signal f(i,j). Assuming now that "C" is a matrix of N×N in which F(u,v) is a component, "A" is a coefficient matrix of N×N, and "X" is a matrix of N×N in which f(i,j) is a component, this discrete cosine transformation is equivalent to the below-mentioned formula, and a product-summation calculation must be carried out $2N^3$ times for each block subdivided by the segmenting circuit 84. That is to say, the calculation must be performed $N^3$ times so as to calculate a product $A^tX$ between X and the matrix $A^t$ of N×N. Furthermore, since the product calculation of the matrix must be executed twice in order to calculate $A^tXA$, a total calculation amounts to $3N^3$.

$$C = A^tXA,$$

where "t" represents a transposed matrix. Also, a component "$a_{ij}$" of A is shown by the below-mentioned formula:

$$a_{ij}\sqrt{\frac{2}{N}} \ C(i) \cos\frac{(2j+1)i\pi}{2N} \ . \qquad (4)$$

In addition, in the decoding device 87, data which has been transferred from either the transmission path, or the image storage apparatus 86 is decoded, so that the decoded image signal 88 is obtained. In this decoding device 87, the following inverse discrete cosine transformation (IDCT) process is performed:

$$f(i,j) = \qquad (5)$$

$$\frac{2}{N} \sum_{i=0}^{N-1} \sum_{j=0}^{N-1} C(u)c(v)f(u,v) \cos\frac{(2i+1)u\pi}{2N} \cos\frac{(2i+1)v\pi}{2N} \ .$$

Similarly, the product summation calculation must be carried out $2N^3$ times with regard to the respective blocks subdivided by the segmenting circuit 84, even in performing this inverse discrete cosine transformation.

In accordance with the above-described conventional method, the discrete cosine transformation and the inverse discrete cosine transformation are required every time the color difference components are transferred, or stored. Even in case that the color difference component within the block subdivided by the segmenting circuit 84 becomes 0 (hereinafter this case will be referred to a "monochrome", whereas a not "monochromatic" case will be called as a "color"), both of the discrete cosine transformation process and the inverse discrete cosine transformation process are required which give a heavy load to the coding device and the decoding device, although these processes are unnecessary when all or part of the color difference component is monochrome. To execute the above-described inverse discrete cosine transformation, at least one discrete cosine transformation coefficient must be transferred, or stored. Accordingly, it is difficult to increase the coding efficiency rather than $1/N^2$ if no consideration is made of the entropy coding operation, resulting in a drawback.

SUMMARY OF THE INVENTION

The present invention has been made in an attempt to solve the above-described problems, and therefore, has an object to provide an image coding apparatus capable of improving a process efficiency and a coding efficiency with regard to either an image or an image region having a less color component, or no color component.

An image coding apparatus according to the present invention is characterized by comprising:
 means for inputting an image signal;
 subdividing means for subdividing the image signal inputted by this input means into predetermined pixel regions;
 recognizing means for recognizing a color component with respect to each of the pixel regions subdivided by said subdividing means;
 coding decision means for determining whether or not a coding operation of a predetermined color component in said pixel region is carried out based on a recognition result made by said recognizing means; and
 coding means for coding the predetermined color component in said pixel region according to a decision of said coding decision means.

In accordance with the image coding apparatus of the present invention, the inputted image signal is subdivided for each of the predetermined pixel regions, and the color components for the respective subdivided pixel regions are recognized. When it is recognized that there is such a color component within the pixel region, the coding operation for the predetermined color component in the pixel region is performed. To the contrary, if recognition is made that no color component is present in the predetermined pixel region, the coding operation of the color component is not performed.

BRIEF DESCRIPTION OF THE DRAWINGS

For a better understanding of the present invention, reference is made of the following description in conjunction with the accompanying drawings, in which.

DETAILED DESCRIPTION OF THE PREFERRED EMBODIMENTS

Figure 1:
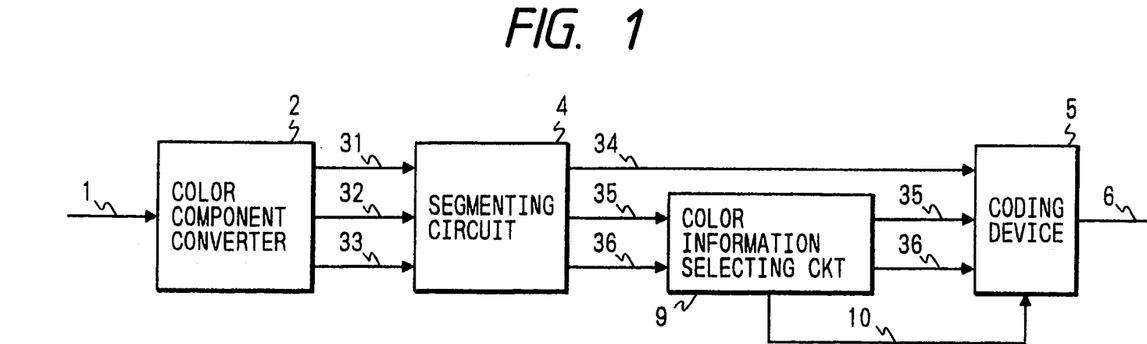
FIG. 1 is a schematic block diagram for showing an arrangement of an image coding apparatus according to the present invention.

Referring now to drawings, a preferred embodiment of the present invention will be described. FIG. 1 is a schematic block diagram for showing an arrangement of an image coding apparatus according to the present invention. In FIG. 1, reference numeral 1 indicates an input image signal, reference numeral 2 denotes a color component converter, reference numerals 31, 32, 33 show color components converted by the color component converter 2, and reference numeral 4 indicates a segmenting circuit for extracting blocks from the respective color components 31, 32 and 33. Furthermore, reference numerals 34, 35 and 36 indicate either a luminance color component, or density color component and a color difference component made by segmenting the color components 31, 32, 33, reference numeral 5 indicates a coding device for coding the respective color components, reference numeral 6 shows either a transmission path or an image storage apparatus, reference numeral 9 represents a color information selecting circuit for selecting the components 35, 36, and also reference numeral 10 shows a judgment result (hereinafter referred to "information") for either a monochrome, or a color obtained from the color information selecting circuit 9.

Figure 2:
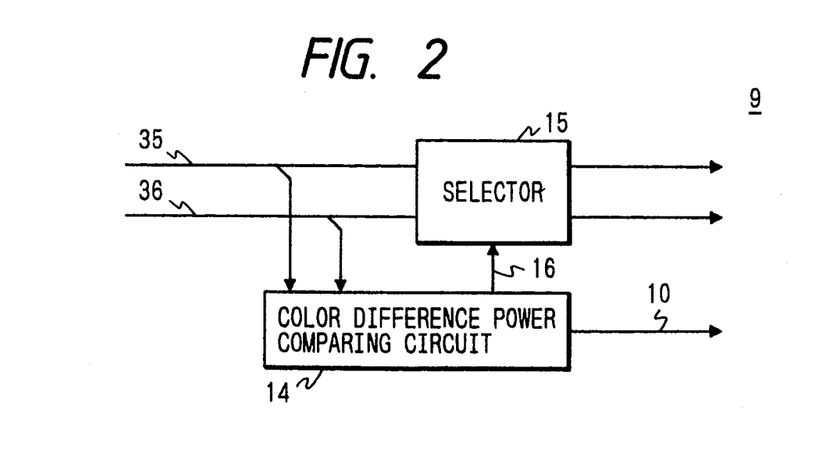
FIG. 2 is a schematic block diagram for representing an arrangement of a color information selecting circuit used in the image coding apparatus indicated in FIG. 1.

FIG. 2 is a schematic block diagram showing an arrangement of the above-described color information selecting circuit 9. In FIG. 2, reference numeral 14 is a color difference power comparing circuit for comparing the color difference signal with a threshold value to judge whether or not the input image corresponds to a monochrome image, and reference numeral 15 indicates a selector for selecting whether or not the color difference information 35 and 36 is transferred to the coding device 5 based on the judgement information 16 derived from the color difference power comparing circuit 14.

Figure 3:
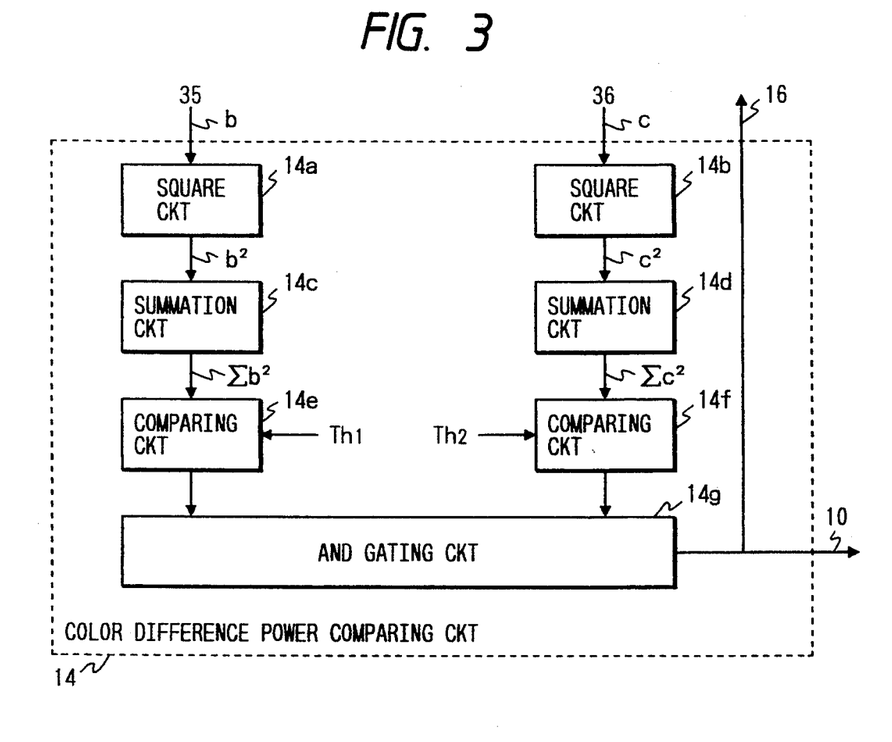
FIG. 3 is a schematic diagram for indicating an example of an arrangement of a color difference power comparing circuit shown in FIG. 2.

FIG. 3 is a schematic diagram for indicating a constructive example of the above-mentioned color difference power comparing circuit 14. In this color difference power comparing circuit 14 of FIG. 3, reference numerals 14a and 14b show square circuits for squaring the color difference signals to obtain power, reference numerals 14c and 14d are summation circuits for summing power within the blocks, reference numerals 14e and 14f denote comparing circuits for comparing each power with a predetermined threshold value, and reference numeral 14g indicates an AND gating circuit for outputting judgement information 10 and 16 based on the comparison result.

Figure 4:
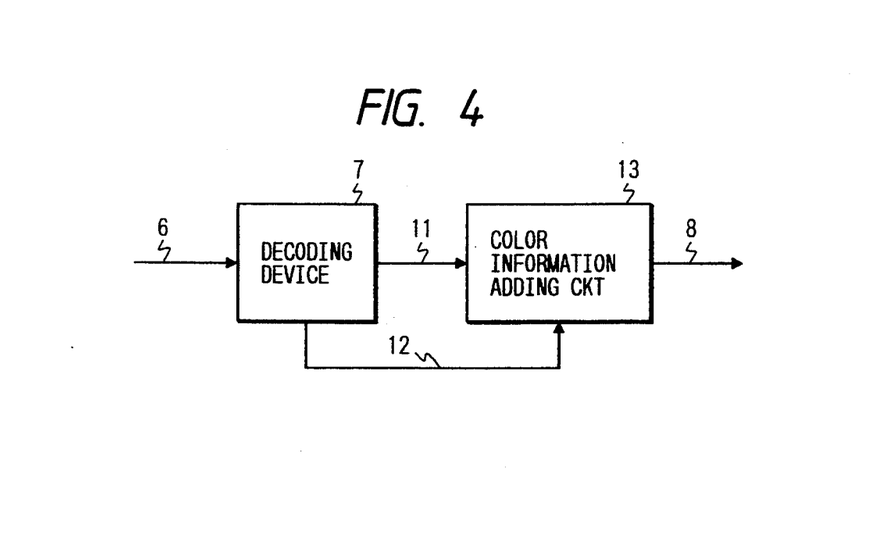
FIG. 4 schematically illustrates an arrangement of an image decoding apparatus for decoding information coded by the image coding apparatus according to the present invention.

FIG. 4 is a schematic constructive circuit of an image decoding apparatus for decoding information which has been coded by the image coding apparatus according to the present invention. In FIG. 4, reference numeral 7 denotes a decoding device for decoding each of the color components, reference numeral 11 indicates an image information decoded result, reference numeral 12 shows judgement information decoded by the decoding device 7, reference numeral 8 indicates a decoded image signal, and also reference numeral 13 denotes a color information adding circuit for adding the judgement result 12 to the image information decoded result 11.

Next, an operation of the image coding apparatus according to the present invention will now be explained with reference to FIGS. 1 to 3. The input image signal 1 shown in FIG. 1 is inputted into the color component converter 2 to be converted into the color components 31, 32 and 33 of either the density color difference system, or the luminance color difference system. As shown in FIG. 5, for instance, the input image 1 of the RGB components is converted by the color component converter 2 into Lab components. It is now assumed that the color components 31 and 34 among the respective color components are either density components, or the luminance components, and also color components 32, 33, 35 and 36 are the color difference components. As schematically illustrated in FIG. 6, for example, the respective color components are subdivided into blocks constructed of "m" × "n" pixels by the segmenting circuit 4. Subsequently, either the density component or the luminance component 34 is sent to the coding device 5. With respect to the color difference components 35 and 36, a judgement is made in the color information selecting circuit 9 as to whether the input image corresponds to the monochromatic image, or the color image. In case of the monochromatic image, the color difference components 35 and 36 are not sent to the coding device 5. Only in case of the color image, the color difference components 35 and 36 are transferred to the coding device 5. Also, the judgement result 10 as to whether the color difference information 35, 36 corresponds to the monochromatic information or the color information, obtained from the color information selecting circuit 9 is similarly transferred to the coding device 5.

Figure 7:
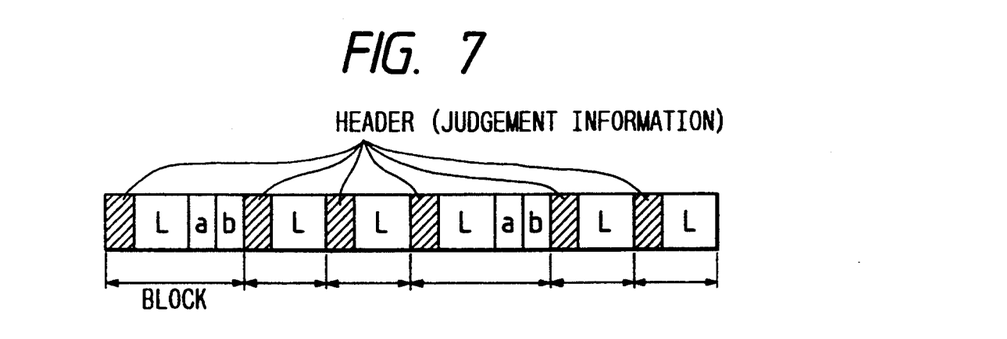
FIG. 7 is an explanatory diagram for indicating a method for adding discrimination information in the block interleave method.
Figure 8:
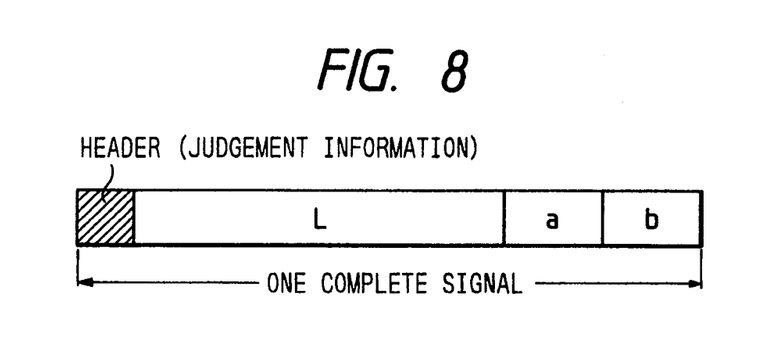
FIG. 8 is an explanatory diagram for representing a method for adding discrimination information in the non-interleave method.

In the coding device 5, either three sorts of image information 34, 35, 36, or one sort of image information 34 and the judgement information 10 are coded and then is transferred to either the transmission path, or the image storage apparatus 6. In the block interleave method for sequentially outputting the color components with respect to each block, for example, as shown in FIG. 7, the above-described judgement information 10 is added to the respective blocks subdivided by the segmenting circuit 4 as a header. To the contrary, in the non-interleave method for coding the subsequent color component after all of the coding data relating to a single image with respect to one color component have been outputted, as shown in FIG. 8, for example, the above-described judgement information 10 is added as a header for a single complete input image.

A schematic diagram of the color information selecting circuit 9 is shown in FIG. 2. In this drawing, color difference components of either an image, or an image block to be coded are assumed as "b" and "c". The color difference components 35 and 36 transferred from the segmenting circuit 4 are calculated in accordance with the following formula by the color difference power comparing circuit 14 with respect to the block subdivided by the segmenting circuit 4:

if $\Sigma b^2 \leq Th_1$ and $\Sigma c^2 \leq Th_2$, then it is judged: monochrome, otherwise: color, where "$Th_1$" and "$Th_2$" are predetermined threshold values.

FIG. 3 represents an example of a circuit arrangement by which the calculation performed in the above-described color difference power comparing circuit 14 is realized by way of a hardware. After the values "b" and "c" of the color difference components 35 and 36 have been squared by the respective squaring circuits 14a and 14b, the power $\Sigma b^2$ and $\Sigma c^2$ within the blocks is obtained by the summation circuit 14c and 14d, respectively. The calculated power $\Sigma b_2$ and $\Sigma c_2$ is compared with the predetermined threshold values $Th_1$ and $Th_2$ in the respective comparing circuits 14e and 14f, respectively. The outputs from the respective comparing circuits 14e and 14f are supplied to the AND gating circuit 14g, so that the judgement results 10, 16 indicating that the input image corresponds to the monochromatic image are outputted therefrom under such a condition $\Sigma b^2 \leq Th_1$ and also $\Sigma c^2 \leq Th_2$. It should be noted that although the calculation has been performed by way of the hardware by the color difference power comparing circuit shown in FIG. 3, alternatively the calculation may be executed by way of a software with employment of a microcomputer, or the like.

At this time, if the block size is equal to N×N with regard to the block subdivided by the above-explained segmenting circuit 4, then the number of the product-summation calculation amounts to $2N^2$. That is, in case that the block size is equal to N×N, since the total pixel number becomes $N^2$, the sequaring calculation per 1 block must be carried out. $N^2$ times with respect to one sort of color difference component. This is applied to two sorts of color difference components, so that the total calculation number becomes $2N^2$.

Also, the judgement information 16 is transmitted from the color difference power comparing circuit 14 to the selector 15, in which the below-mentioned process for the color difference information is carried out: in case of monochromatic information, this information is passed. Otherwise, in case of color information, this information is not passed.

With respect to the amount of the above-explained product-summation calculation in this case, a description will now be made in comparison between the present invention and the conventional method. In accordance with the conventional method (JPEG method), since the discrete cosine transformation process must be performed with respect to the three color components in case of the monochromatic information, which is similar to that of the color information, a total number of the product summation calculation becomes $6N^3$ per $N \times N$ blocks. To the contrary, according to the present invention, the product-summation calculation is carried out $(2N^2+6N^3)$ times for the color information, and performed $(2N^2+2N^3)$ times for the monochromatic information. In other words, in case of the color information since the calculation time required to compare the color difference power becomes $2N^2$ and also the calculation time required to effect the discrete cosine transformation becomes $2N^3$ per one sort of color component, the calculations for three sorts of color difference must be performed $2N^3 \times 3$ times, and therefore a total calculation number becomes $2N^2+6N^3$. In case of the monochromatic information, since the calculation number required to compare the color difference becomes $2N^2$ and also the calculation number required to effect the discrete cosine transformation only for one sort of color component becomes $2N^3$, a total calculation number becomes $2N^2+2N^3$. It should be noted that all of three color components are constituted by $N \times N$ blocks, respectively.

In the preferred embodiments as shown in FIG. 1 and 2, the circuit arrangements which are increased, as compared with those of the conventional image coding/decoding apparatus, is a product-summation calculation circuit which performs calculations $2N^2$ times per $N \times N$ block in the color-difference power comparing circuit 14, whose calculation times is less than that of a product-summation calculation circuit which performs the product-summation calculations $2N^3$ times per $N \times N$ block in the discrete cosine transform (DCT) circuit and the inverse discrete cosine transform (IDCT) circuit. Accordingly, in the present invention, the coding efficiency can remarkably be heightened with a simple circuit construction, in comparison with the conventional method.

The operation of the decoding device will be described with reference to FIG. 4. In the decoding device 7 shown in the figure, information which has been transmitted from the transmission path or image storage apparatus 6 is decoded, and then the image information 11 and the judgement information 12 are transmitted to the color information adding circuit 13. In the color information adding circuit 13, when the judgement result of the judgement information 12 is monochrome, the color difference component is added as a predetermined value, for example, 0 (zero). When the judgement result is color, then no operation is performed. With these operations, the decoding image 8 can be obtained.

In the embodiment described above, the input image component is of the RGB system whereas the output of the color component converter 2 is of the Lab system. However, the input image color component is not limited to the RBG system. Further, the output of the color component converter 2 is not limited to the Lab system, and may be of a color space of other density color difference system or the luminance color difference system. Further, in the above-described embodiment, the size of the block is $m \times n$, however it is apparent that the configuration of the block is not limited to a regular square.

Further, in the above-described embodiment, the position at which the judgement information 10 is added in the coding device 5, in the block-interleave system shown in Fig. 7, is a header of each block which has been subdivided by the segmenting circuit 4, and in the non-interleave system shown in FIG. 8, is a header for a single complete input image. However, the position at which the judgement information 10 is added in the coding device 5 is not limited to these embodiments, and may be anywhere if it is specified which block the judgement information 10 is related to.

Further, in the above-described embodiment, all of the respective color components are constituted by $N \times N$ block. However, it may execute the coding and decoding processes with respect to such a block from which pixels of a partial color component have been thinned out.

Furthermore, in the above-described preferred embodiments, the color difference components "b" and "c" are independently compared with the threshold values during the color difference power comparison. Alternatively, methods other than the above-described comparing method may be employed. For instance, such methods for comparing $\Sigma(|b|+|c|)$ with a threshold value, or $\Sigma(b^2+c^2)$ with a threshold value may be utilized.

Moreover, when an input image is not only a monochromatic image, but also a specific color image, this specific color component may not be coded.

Further, an embodiment of a coding apparatus including a picture/character separation circuit will be described with reference to FIG. 10.

Figure 10:
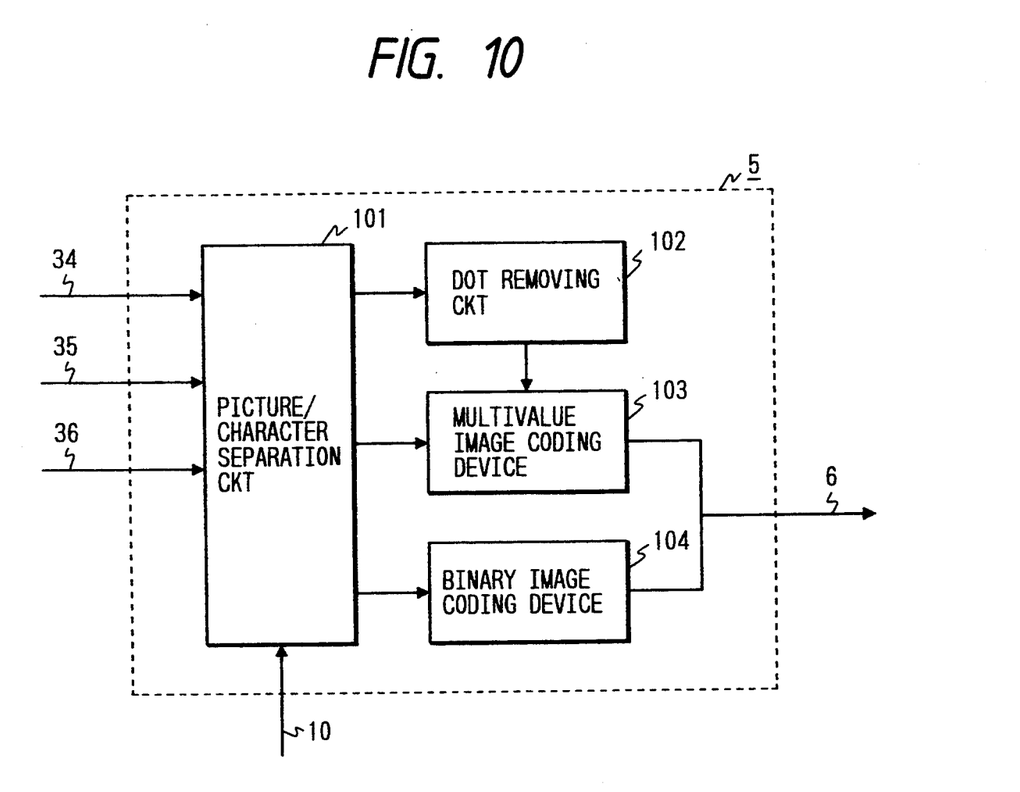
FIG. 10 is a schematic block diagram for showing an image coding device having a picture/character separation circuit according to the present invention.

The coding apparatus according to this embodiment is the same as that of FIG. 1 in construction and function other than the arrangement of an image coding device 5 including a picture/character separation circuit as shown in FIG. 10. The image coding device 5 is constructed by a picture/character separation circuit 101, a dot removing circuit 102, a multivalue image coding device 103, and a binary image coding device 104. The picture/character separation circuit 101 is so arranged as to input the luminance or density component signal 34, and the color difference component signals 35 and 36, which have been obtained from the input image signal 1 processed by the color component converter 2 and the segmenting circuit 4, and also to input the judgement result signal 10 obtained by a color information selecting circuit 9, which represents whether the input image signal is monochrome or color. In case where the input image data is representative of monochrome image, the picture/character separation circuit 101 executes a picture/character separation process within a block in accordance with only the density or luminance component signal 34. In case where the input image data is representative of color image, the separation circuit 101 executes the picture/character separation process within a block in accordance with the density or luminance component signal 34, singly or in cooperation with the color difference component signals 35 and 36.

Various sorts of picture/character separation methods are known. For example, there may be used a method in which the maximum and minimum density values of pixels within a block are detected by a maximum value detection circuit and a minimum value detection circuit, respectively and a difference between the maximum and minimum density values is calculated by an operation circuit. In the method, the calculated value is then compared with a predetermined threshold value so that an image area is divided into three areas composed of a dot area, a character area and a photograph area based on the comparison result. If it is judged that a block is of the dot area, the information from the picture/character separation circuit 101 is input to the dot removing circuit 102 to be subjected to smoothing process and then input to the multivalue image coding device 103. If it is judged that the block is of the photograph area, the information from the separation circuit 101 is input to the multivalue image coding device 103 to be coded into multivalues in the multivalue image coding device 103 in accordance with the known JPEG method. If it is judged that the block is of the character area, the image information is input to the binary coding device 104 to be coded into binary values in accordance with the known JBIG method.

Similarly to the coding information of the above-mentioned embodiments, the position of the judgement information relating to the picture/character separation is, in the block interleave method, added as a header to each block subdivided by the segmenting circuit 4, as shown in FIG. 7, and in the non-interleave method, added as a header for a single complete input image, as shown in FIG. 8.

The picture/character separation may be executed for only two sorts of areas such as the character area and the photograph area. Also, as the separation method, there may be used a method of detecting an edge of an input image, a method of employing an absolute value of luminance data, a method of using an electric power distribution of transformation coefficient obtained by orthogonally transforming image data, and a method of using a G/S analysis such as the GVTC method, other than the above-mentioned method of comparing the maximum and minimum values with a threshold value. Further, in the coding process, all the areas may be binary-coded by a binary image coding device.

As previously explained, in accordance with the present invention, when the image signal is coded for each of the color components, in case that there is neither a monochromatic component, nor a specific color component in a portion of an input image, or in an entire input image, this color component is not coded.

As a consequence, it is possible to omit the discrete cosine transformation and the inverse discrete cosine transformation in which the product-summation calculation is required $2N^3$ for each $N \times N$ block with regard to one color component in the prior art. That is, according to the present invention, only the number of product-summation calculation amounts to $2N^2$ per $N \times N$ block, so that loads given to the coding device and the decoding device can be reduced.

Further, since the loads given to the decoding device and the coding device are reduced, the coding and decoding speeds are increased.

Still further, since no color difference component is transmitted when a block is a monochrome, the coding efficiency can be increased.

What is claimed is:

1. An image coding apparatus, comprising:
   means for inputting an image signal;
   subdividing means for subdividing the image signal inputted by said input means into predetermined pixel regions of a plurality of pixels;
   recognizing means for recognizing a color component with respect to each of the pixel regions subdivided by said subdividing means, the recognizing means including:
      means for obtaining power of the respective color components of the inputted image signal for each of the subdivided pixel regions; and
      means for comparing the obtained power with a predetermined threshold value;
   coding decision means for determining whether or not a coding operation of a predetermined color component in said pixel regions is carried out according to a recognition result made by the recognizing means, wherein said coding decision means makes such a decision for not performing the coding operation of the color component in case that said obtained power is less than said predetermined threshold value; and
   coding means for coding the predetermined color component in said pixel regions according to a decision made by the coding decision means.

2. An image coding apparatus as claimed in claim 1, further comprising:
   means for adding to the coded image signal, judgement information indicative of a decision whether or not the coding operation of said color component is performed.

3. An image decoding apparatus for decoding an image signal coded by the image coding apparatus as defined in claim 1, comprising:
   decoding means provided for the respective colors; and
   means for substituting the color component which has not been coded by a preset specific pixel value when said judgement information represents such a decision that the coding operation of the color component is not executed.

4. An image communication system, comprising:
   means for inputting an image signal;
   subdividing means for subdividing the image signal inputted by said input means into predetermined pixel regions of a plurality of pixels;
   recognizing means for recognizing a color component with respect to each of the pixel regions subdivided by said subdividing means, the recognizing means including:
      means for obtaining power of the respective color components of the inputted image signal for each of the subdivided pixel regions; and
      means for comparing the obtained power with a predetermined threshold value;
   coding decision means for determining whether or not a coding operation of a predetermined color component in said pixel regions is carried out according to a recognition result made by the recognizing means, wherein said coding decision means makes such a decision for not performing the coding operation of the color component in case that said obtained power is less than said predetermined threshold value;

coding means for coding the predetermined color component in said pixel regions according to a decision made by the coding decision means;

decoding means provided for the respective colors; and means for substituting the color component which has not been coded by a preset specific pixel value when said judgement information represents such a decision that the coding operation of the color component is not executed.

* * * * *